United States Patent
Yang

(10) Patent No.: US 12,209,448 B2
(45) Date of Patent: Jan. 28, 2025

(54) METHOD AND APPARATUS FOR CONTROLLING A VEHICLE FOR CONVENIENT TRUNK USE

(71) Applicants: HYUNDAI MOTOR COMPANY, Seoul (KR); KIA CORPORATION, Seoul (KR)

(72) Inventor: Hee Gun Yang, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 238 days.

(21) Appl. No.: 17/876,214

(22) Filed: Jul. 28, 2022

(65) Prior Publication Data
US 2023/0160252 A1 May 25, 2023

(30) Foreign Application Priority Data
Nov. 23, 2021 (KR) .......... 10-2021-0162704

(51) Int. Cl.
| | |
|---|---|
| E05F 15/73 | (2015.01) |
| B60Q 9/00 | (2006.01) |
| B60R 25/31 | (2013.01) |
| B62D 15/02 | (2006.01) |
| E05F 15/40 | (2015.01) |

(52) U.S. Cl.
CPC .......... *E05F 15/73* (2015.01); *B60Q 9/00* (2013.01); *B62D 15/025* (2013.01); *E05F 15/40* (2015.01); *E05Y 2400/44* (2013.01); *E05Y 2400/45* (2013.01); *E05Y 2400/54* (2013.01); *E05Y 2800/10* (2013.01); *E05Y 2900/548* (2013.01)

(58) Field of Classification Search
CPC ......... E05F 15/73; E05F 15/40; B62D 15/025
See application file for complete search history.

(56) References Cited

U.S. PATENT DOCUMENTS

| | | | |
|---|---|---|---|
| 2015/0073666 A1* | 3/2015 | Dotterweich ........... | E05F 15/73 701/49 |
| 2017/0267244 A1* | 9/2017 | Kim .................... | B60W 10/182 |
| 2018/0297519 A1* | 10/2018 | Singh .................... | H04N 7/181 |
| 2019/0128047 A1* | 5/2019 | Kang .................... | B60W 40/10 |
| 2019/0323281 A1* | 10/2019 | Ghannam ................ | B60J 5/101 |
| 2020/0056417 A1* | 2/2020 | Lee ........................ | E05F 15/73 |
| 2020/0115951 A1* | 4/2020 | Naserian ................ | E05F 15/73 |
| 2020/0254928 A1* | 8/2020 | Monteiro ................ | B60Q 9/00 |
| 2021/0246708 A1* | 8/2021 | Mönig .................... | B62D 33/03 |

* cited by examiner

*Primary Examiner* — Long T Tran
(74) *Attorney, Agent, or Firm* — Lempia Summerfield Katz LLC

(57) ABSTRACT

A method of and an apparatus for controlling a vehicle for convenient trunk use. The method, performed by a device of a vehicle, for controlling the vehicle, includes recognizing a request to use a trunk, obtaining parking status information of the vehicle, controlling the vehicle to secure a trunk working space for trunk use based on the parking status information of the vehicle, and opening a door of the trunk in response to securing the trunk working space.

14 Claims, 4 Drawing Sheets

METHOD AND APPARATUS FOR CONTROLLING A VEHICLE FOR CONVENIENT TRUNK USE

CROSS-REFERENCE TO RELATED APPLICATIONS

This application is based on and claims priority to Korean Patent Application No. 10-2021-0162704, filed on Nov. 23, 2021, the disclosure of which is incorporated by reference herein in its entirety.

TECHNICAL FIELD

The present disclosure relates to a method of and an apparatus for controlling a vehicle for convenient trunk use.

BACKGROUND

The statements in this section merely provide background information related to the present disclosure and do not necessarily constitute prior art.

To use the trunk of a vehicle, sufficient working space needs to be secured to access the trunk at that side of the vehicle. Vehicles such as sport utility vehicles (SUVs) cannot spread out (e.g., open or lower) their tailgate before securing a certain rear space around the vehicle. Even with the trunk door, e.g., tailgate or trunk lid opened, the user is cramped for room and may not be able to enter the side of the vehicle with the trunk or may feel uncomfortable in loading or unloading goods at the trunk.

The space around the vehicle may vary depending on the parking type of the vehicle (e.g., forward parking, reverse parking or parallel parking, and the like), and the space around the vehicle may change according to the situation after parking. For example, even when a first vehicle is parked, considering the convenience of using the trunk, if a second vehicle comes and parks too close to the first vehicle's tail, the first vehicle is deprived of space for using the trunk. In this case, the user can use the trunk only after getting in the vehicle, starting, and re-parking the same.

SUMMARY

According to at least one embodiment, the present disclosure provides a method, performed by a device of a vehicle, for controlling the vehicle, including recognizing a request to use a trunk and obtaining parking status information of the vehicle. The method further includes controlling the vehicle to behave to secure a trunk working space for use of the trunk based on the parking status information of the vehicle, and opening a door (e.g., tailgate or trunk lid) of the trunk in response to securing the trunk working space.

According to another embodiment, the present disclosure provides an apparatus for controlling a vehicle, including a control unit configured to obtain parking status information of the vehicle in response to a request to use a trunk. The control unit is further configured to control the vehicle to behave to secure a trunk working space for use of the trunk based on the parking status information of the vehicle, and to open a door of the trunk in response to securing the trunk working space.

According to yet another embodiment, the present disclosure provides a vehicle including the apparatus for controlling the vehicle as described above.

DETAILED DESCRIPTION

Figure 1:
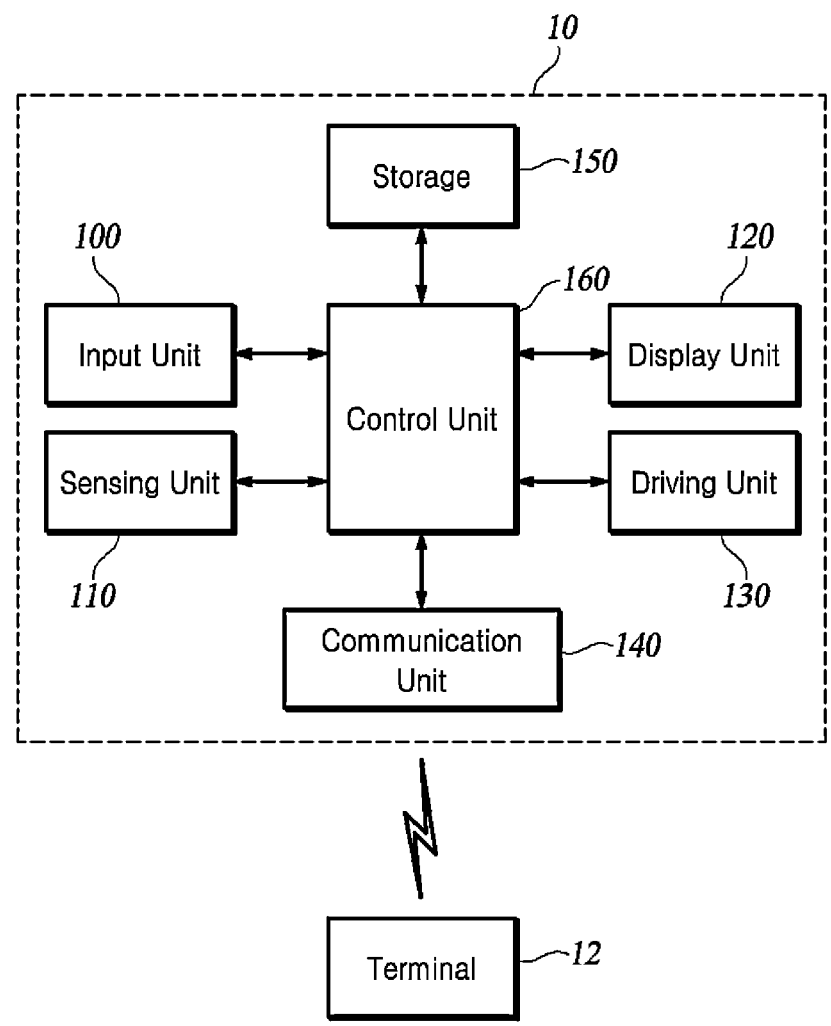
FIG. 1 is a block diagram of a vehicle according to at least one embodiment of the present disclosure.

The present disclosure in some embodiments seeks to provide a method and apparatus capable of improving vehicle user's convenience by figuring out the space around the vehicle and moving the vehicle to secure a space for use of a trunk.

Hereinafter, some embodiments of the present disclosure are described in detail with reference to the accompanying drawings. In the following description, like reference numerals preferably designate like elements, although the elements are shown in different drawings. Further, in the following description of some embodiments, a detailed description of related known components and functions, when considered to obscure the subject of the present disclosure, are omitted for the purpose of clarity and for brevity.

Additionally, various terms such as first, second, A, B, (a), (b), and the like, are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

When a component, device, element, or the like of the present disclosure is described as having a purpose or performing an operation, function, or the like, the component, device, or element should be considered herein as being "configured to" meet that purpose or to perform that operation or function.

It is understood that the term "trunk" or other similar term as used herein is inclusive of cargo space of a vehicle such as a trunk, front trunk, i.e., frunk, and the like.

FIG. 1 is a block diagram of a vehicle 10 according to at least one embodiment of the present disclosure.

As shown in FIG. 1, the vehicle 10 may include an input unit 100, a sensing unit 110, a display unit 120, a driving unit 130, a communication unit 140, a storage 150, and a control unit 160, in whole or in part. Not all blocks shown in FIG. 1 are requisite components, and some blocks included in the vehicle 10 may be added, changed, or deleted in another embodiment. The respective components may be implemented as hardware or software or as a combination of hardware and software. Additionally, the function of each component may be implemented by software, and the function by software for each component may be implemented to be executed by at least one or more microprocessors.

The respective components may exchange signals via an internal communication system (not shown). The signals may include data. The internal communication system may use at least one communication protocol (e.g., CAN, LIN, FlexRay, MOST, Ethernet).

The apparatus for controlling a vehicle according to at least one embodiment of the present disclosure includes one or more of a device, a unit, and logic installed in the vehicle 10. For example, the vehicle controlling apparatus may include all or some of the communication unit 140, the control unit 160, and the storage 150.

The input unit 100 may be configured to receive a user input for trunk use. For example, the input unit 100 may be configured to receive a trunk use request and/or a trunk use termination request from a user. The input unit 100 may be implemented as, for example, at least one of one or more buttons, a jog dial, and a touchpad. The input unit 100 may be implemented as a touch display or the like in combination with the display unit 120.

The sensing unit 110 may be configured to recognize the surrounding situation of the vehicle 10. For example, the vehicle 10 may use the sensing unit 110 to detect obstacles about the vehicle 10, such as another vehicle or a wall. The sensing unit 110 may be implemented as, for example, at least one of an image sensor, a radar, a lidar, and an ultrasonic sensor.

In some embodiments, when the vehicle 10 is configured to be responsive to the user approaching the vehicle 10, or responsive to the user making a certain motion to provide a smart tailgate function that automatically opens the trunk door (e.g., tailgate or trunk lid), the sensing unit 110 may further include a sensor for detecting the user's approach or the certain motion. Upon detecting a user's approach or a certain motion generated by the user, the sensing unit 110 may be configured to transmit a trunk use request to the control unit 160.

The display unit 120 may be configured to visually provide the user with information about the behavior of the vehicle 10. The display unit 120 may be implemented as a display disposed in one area of the vehicle 10, such as a seat, an audio video navigation (AVN), a head-up display (HUD), a graphical user interface (GUI), and/or a cluster. The display unit 120 may be implemented as a touch display or the like in combination with the input unit 100.

The driving unit 130 may be configured to control the operation of various devices related to the behavior of the vehicle 10, such as starting, steering, braking, speed changing or shifting, and opening and closing of the trunk door of the vehicle 10. For example, the driving unit 130 may include all or some of a driving unit as a power source, a driving unit for the steering unit, a driving unit for the brake unit, and a driving unit for the trunk door. The driving unit 130 may include one or more processors. According to embodiments, components of the driving unit 130 may each include an individual processor. The driving unit 130 may be operated under the control of the control unit 160.

The present application does not reiterate the method of controlling, by the driving unit 130, the operation of various units and devices related to the behavior of the vehicle 10, such as starting, steering, braking, shifting, and opening and closing of the trunk door of the vehicle 10 because the method is commonly known in this technical field.

The communication unit 140 may be configured to communicate with at least one external device of the vehicle 10. According to embodiments, the communication unit 140 may be configured to perform wired/wireless communications with a terminal 12. The terminal 12 may be implemented as an electronic device possessed by the user of the vehicle 10, such as a smart key, a smartphone, a smart watch, and a tablet, among others.

The communication unit 140 may be configured to receive a user's input about trunk use from the terminal 12.

For example, the communication unit 140 may be configured to receive a trunk use request and/or a trunk use termination request from the terminal 12 and transmit it to the control unit 160.

The communication unit 140 may be configured to transmit information on the behavior of the vehicle 10 to the terminal 12. For example, the communication unit 140 may be configured to receive information on the behavior of the vehicle 10 from the control unit 160 and transmit it to the terminal 12.

The storage 150 may be configured to store various programs and data for implementing the vehicle control method according to at least one embodiment of the present disclosure. For example, the storage 150 may be configured to store a program for the operation of the control unit 160, and it may temporarily store data input/output to the control unit 160.

The control unit 160 may be configured to interwork with the input unit 100, sensing unit 110, display unit 120, driving unit 130, communication unit 140, and storage 150 to perform calculations and controls for securing the space for trunk utilization. In addition, the control unit 160 may be implemented as one or more processors. For example, the control unit 160 may be implemented as an electronic control unit (ECU), a micro controller unit (MCU) or any other sub-controller installed in the vehicle 10.

The control unit 160 may be configured to obtain the parking status information of the vehicle 10 in response to the trunk use request. The control unit 160 may be further configured to control, based on the parking status information of the vehicle 10, the vehicle 10 to behave or move to secure a space for utilizing the trunk. Furthermore, the control unit 160 may be configured to open the door of the trunk in response to securing the space for use of the trunk.

The control unit 160 may be configured to recognize a trunk use request and a trunk use termination request based on information received from the input unit 100, sensing unit 110, and/or communication unit 140.

For example, in response to receiving a first input of the user through the input unit 100 or the communication unit 140, the control unit 160 may be configured to recognize it as a trunk use request. Likewise, in response to receiving the user's second input, the control unit 160 may be configured to recognize it as a trunk use termination request.

As another example, the control unit 160 may be configured to operate based on the image or signal received from the sensing unit 110 to be responsive to a detection of the user's approach or a first motion for recognizing it as a trunk use request. The control unit 160 may be further configured to operate based on the image or signal received from the sensing unit 110 to be responsive to a detection of the user's distancing or a second motion for recognizing it as a request to terminate trunk use.

The method by which the control unit 160 recognizes the trunk use request and/or the trunk use termination request is not limited to the above-described example. Further, the control unit 160 may use various methods that can be implemented in the vehicle 10 to recognize a trunk use request and/or a trunk use termination request.

The control unit 160 may be configured to obtain, based on the image or signal received from the sensing unit 110, the parking status information of the vehicle 10. To obtain the parking status information of the vehicle 10, the control unit 160 may be configured to detect one or more obstacles (e.g., other vehicles, walls, or objects) around the vehicle 10. The control unit 160 may be configured to detect the presence of an obstacle, the size of the obstacle, a distance from the obstacle, and the like. The control unit 160 may be configured to determine the parking type (e.g., parallel parking or perpendicular parking) of the vehicle 10 as the parking status information of the vehicle 10.

The present application does not reiterate and is not limited to a particular method of detecting an obstacle around the vehicle 10 or determining the parking type of the vehicle 10 based on the image or signal received from the sensing unit 110 because such a method is commonly known in the field of image recognition and/or signal processing.

The control unit 160 may be configured to determine, based on the image or signal received from the sensing unit 110, whether it is good to open or close the trunk door, and whether it is convenient for the user to enter the trunk and/or load and unload goods into/from the trunk. To this end, the control unit 160 may be configured to determine whether a space is secured for use of the trunk around the vehicle 10. The space for using the trunk may include a space for opening a door of the trunk, a space for the user to enter the trunk side of the vehicle 10, and a space for loading and unloading goods into/from the trunk. The trunk side of the vehicle 10 may be, but is not limited to, a rear of the vehicle 10 or a front of the vehicle 10.

According to embodiments, the control unit 160 compares the distance to the obstacle with a preset reference distance to determine whether the trunk door may be opened or closed well, whether the user can conveniently enter the trunk side of the vehicle 10, and/or whether the user can conveniently load and unload goods.

According to embodiments, the control unit 160 may be configured to define a first minimum space required to open the door of the trunk, a second minimum space required for the user to enter the trunk side of the vehicle 10, and a third minimum space necessary for loading and unloading goods. Then, based on whether an obstacle is detected in the first to third minimum spaces, the control unit 160 may be configured to determine whether the trunk door may be opened or closed well (e.g., sufficiently), whether the user can conveniently enter the trunk side of the vehicle 10, and/or whether the user can conveniently load and unload goods into and out of the trunk.

The control unit 160 may be configured to determine whether an obstacle around the vehicle 10 prevents the use of the trunk. In response to determining that an obstacle around the vehicle 10 disables or impedes any one or more of opening/closing of the trunk door, the user's entry into the trunk side of the vehicle 10, and/or loading and unloading the trunk, the control unit 160 may be configured to conclude that the obstacle around the vehicle 10 prevents the use of the trunk.

In response to concluding that the obstacle around the vehicle 10 prevents the use of the trunk, the control unit 160 may be configured to control the vehicle 10 to move to secure a space for trunk use. For example, the control unit 160 may be configured to change the parking position and/or posture of the vehicle 10 to secure a space for trunk use.

According to embodiments, the control unit 160 may be configured to determine a parking position and/or posture (hereinafter, a target parking state) capable of securing a space for use of the trunk. The control unit 160 may be configured to generate a trajectory for moving the vehicle 10 from the current parking position and/or posture (hereinafter, original parking state) to the target parking state while avoiding obstacles around the vehicle 10.

The control unit 160 may generate control information for controlling one or more of starting, steering, braking, and shifting of the vehicle 10 to move the vehicle 10 to the target parking state. In addition, the control unit 160 may provide the generated control information to the driving unit 130.

Figure 2A:
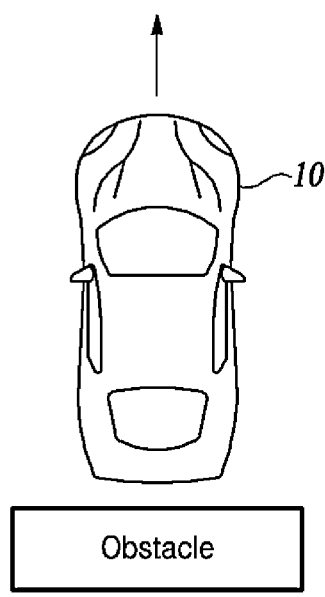
FIG. 2A and FIG. 2B illustrate a situation that needs a space to be secured for trunk use according to at least one embodiment of the present disclosure.
Figure 2B:
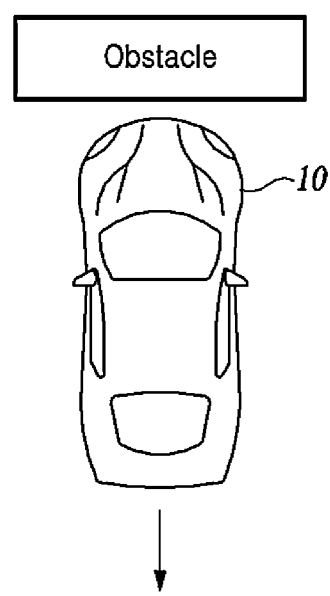

FIG. 2A and FIG. 2B illustrate a situation that needs a space to be secured for trunk use according to at least one embodiment of the present disclosure.

As shown in FIG. 2A, the control unit 160 may be configured to generate control information for moving the vehicle 10 forward in response to determining that a detected obstacle behind the vehicle 10 disables or impedes any one or more of the opening/closing of the trunk door, the user's entry into the trunk side of the vehicle 10, and/or loading and unloading goods.

On the other hand, as shown in FIG. 2B, the control unit 160 may be configured to generate control information for moving the vehicle 10 backward in response to determining that a detected obstacle in the front of the vehicle 10 disables or impedes any one or more of opening/closing of the trunk door, the user's entry into the trunk side of the vehicle 10, and/or loading and unloading goods.

When the vehicle 10 is turned off, the control unit 160 may further generate control information for turning on the vehicle 10 to begin operation.

Figure 3:
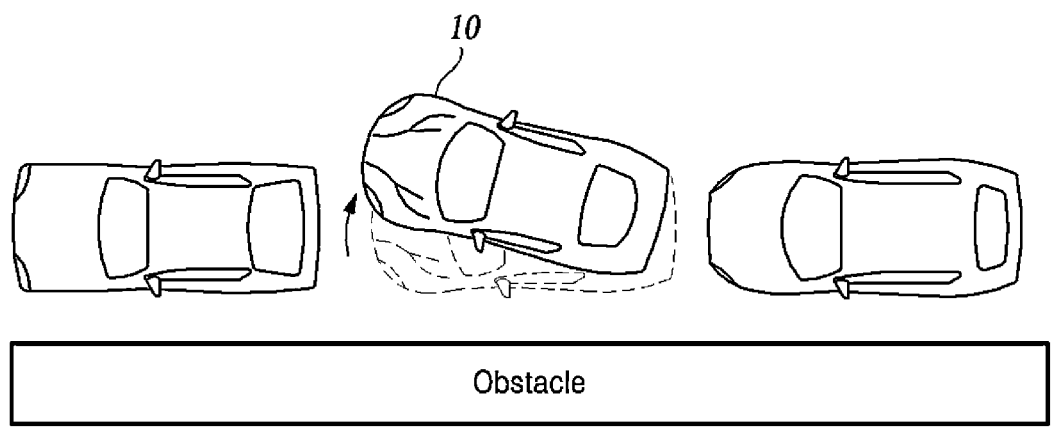
FIG. 3 illustrates a situation that needs a space to be secured for trunk use according to another embodiment of the present disclosure.

FIG. 3 illustrates a situation that needs a space to be secured for trunk use according to another embodiment of the present disclosure.

As shown in FIG. 3, when multiple vehicles are parked in a line, the control unit 160 cannot secure a space for trunk use by moving the vehicle 10 forward or backward. As such, the control unit 160 may be configured to move the vehicle 10 to the side through steering control to secure a space for trunk use in response to determining that an obstacle detected at one side of the vehicle 10 prevents the use of the trunk and that another obstacle detected at another side of the vehicle 10 disables the vehicle 10 from moving straight. The one side and the other side of the vehicle 10 may be, but are not limited to, a rear of the vehicle 10 or a front of the vehicle 10, respectively.

While controlling the behavior of the vehicle 10, the control unit 160 may be configured to provide the user with information on the behavior of the vehicle 10 through the display unit 120 and/or the terminal 12. For example, the control unit 160 may be configured to generate information for notifying the user of the control of the vehicle 10 to secure a space for trunk use and transmit the information to the display unit 120 and/or the communication unit 140. As another example, the control unit 160 may be configured to render information on the expected behavior of the vehicle 10 (e.g., its route or turning direction) to be outputted to the display unit 120 and/or the terminal 12.

The control unit 160 may be configured to control the driving unit 130 to open the door of the trunk. The control unit 160 may be configured to generate one or both of control information for unlocking the trunk door and control information for opening up the trunk door.

After the trunk use is terminated, the control unit 160 may be configured to control the vehicle 10 to move back to the original parking state. The control unit 160 may be configured to generate a trajectory for moving the vehicle 10 from the target parking state to the original parking state while avoiding obstacles around the vehicle 10. In this case, the control unit 160 may be configured to use the reverse trajectory of the trajectory generated earlier for moving the vehicle 10 to the target parking state, among other methods available for this purpose.

Figure 4:
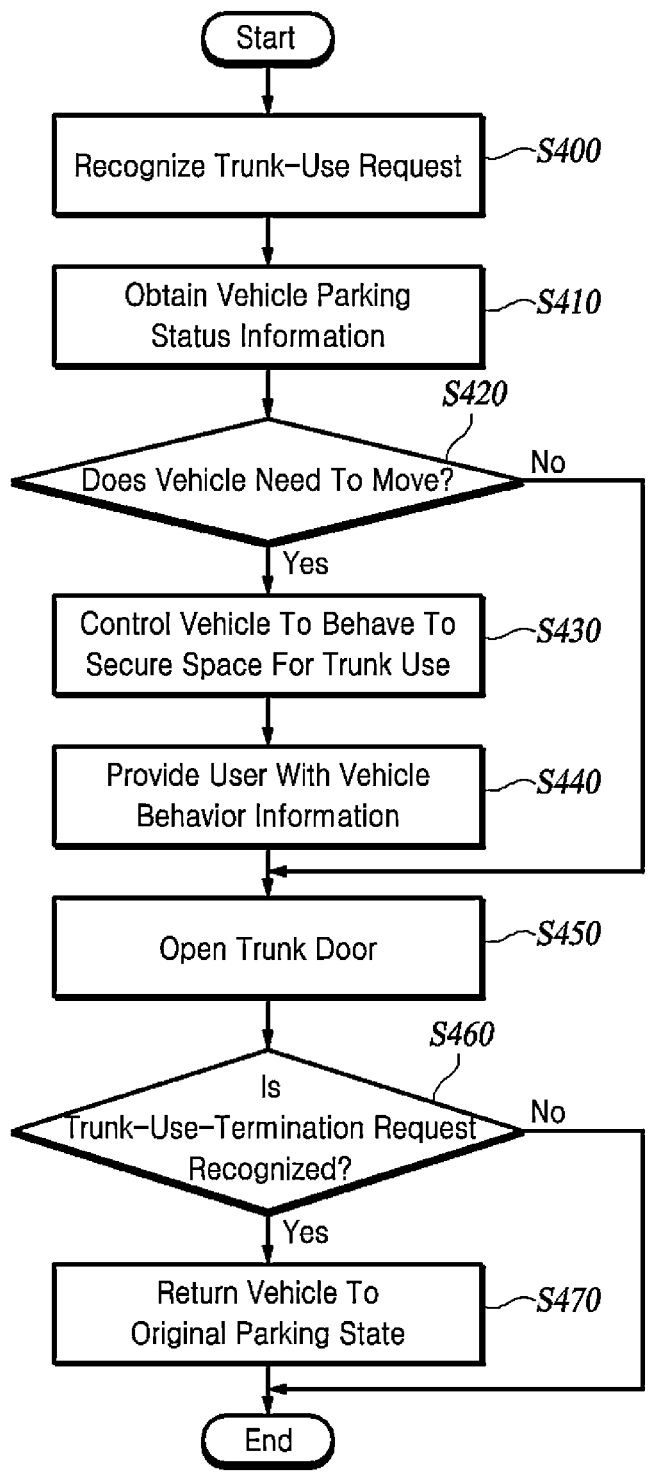
FIG. 4 is a flowchart of a method of controlling a vehicle for convenient trunk use according to at least one embodiment of the present disclosure.

FIG. 4 is a flowchart of a method of controlling a vehicle for convenient trunk use according to at least one embodiment of the present disclosure.

The vehicle controlling method shown in FIG. 4 may be performed by the control unit 160 and the vehicle controlling apparatus having the control unit 160 in FIGS. 1-3, and hence reiterating details thereof are omitted.

The vehicle controlling apparatus recognizes the trunk use request (S400). For example, the vehicle controlling apparatus may recognize the trunk use request by detecting the request when received from the user through the input unit 100 and/or the terminal 12 or detecting the user's approach or a certain motion through the sensing unit 110. The vehicle controlling apparatus may recognize the trunk use request regardless of whether the vehicle 10 is started or whether the user is in the vehicle 10.

The vehicle controlling apparatus obtains the parking status information of the vehicle 10 (S410). The vehicle controlling apparatus may obtain parking status information of the vehicle 10 based on information obtained through the sensing unit 110.

According to embodiments, the vehicle controlling apparatus detects an obstacle around the vehicle 10 for its parking status information, or it determines a parking type of the vehicle 10 (e.g., parallel parking and perpendicular parking, and the like).

According to embodiments, based on information obtained through the sensing unit 110, the vehicle controlling apparatus determines whether an obstacle around the vehicle 10 prevents the use of the trunk. For example, with the vehicle 10 being in the current parking position and/or posture (hereinafter, original parking state), the vehicle controlling apparatus determines whether an obstacle around the vehicle 10 deprives the vehicle 10 of a space that needs to be secured for trunk use. If yes, the vehicle controlling apparatus may conclude that the obstacle around the vehicle 10 is preventing the use of the trunk. The space for using the trunk may include a space for opening a door of the trunk, a space for the user to enter the trunk side of the vehicle 10, and a space for loading and unloading goods into and out of the trunk. The vehicle controlling apparatus may determine whether an obstacle around the vehicle 10 prevents the use of the trunk based on whether that obstacle leaves insufficient space for opening the trunk door, whether it impedes the user's easy access to the trunk side of the vehicle 10, or whether it hinders the user's easy loading and unloading of the trunk.

The vehicle controlling apparatus determines whether the vehicle 10 needs to move in order to use the trunk (S420). In response to determining that an obstacle around the vehicle 10 prevents the use of the trunk, the vehicle controlling apparatus may determine that the vehicle 10 needs to move for trunk use.

In response to determining that the vehicle 10 needs to move, the vehicle controlling apparatus controls the vehicle 10 to behave to secure a space for the trunk use based on the parking status information of the vehicle 10 (S430). To this end, the vehicle controlling apparatus may determine a parking position and/or posture for securing a space for trunk use (hereinafter, referred to as a target parking state). The vehicle controlling apparatus may generate a trajectory for moving the vehicle 10 from its original parking state to the target parking state while avoiding obstacles around the vehicle 10. The vehicle controlling apparatus may control one or more of starting, steering, braking, and shifting of the vehicle 10 to move the vehicle 10 to the target parking state.

For example, the vehicle controlling apparatus may move the vehicle 10 straight to secure a space for trunk use in response to determining that an obstacle detected at the rear or front of the vehicle 10 prevents the use of the trunk.

As another example, the vehicle controlling apparatus may control the steering of the vehicle 10 to secure a space for trunk use in response to determining that an obstacle detected at one side of the vehicle 10 prevents the use of the trunk and that another obstacle detected at another side of the vehicle 10 prevents moving the vehicle 10 forward or backward.

As yet another example, the vehicle controlling apparatus may control the steering of the vehicle 10 to secure a space for trunk use in response to determining that the parking type of the vehicle 10 is parallel parking.

The vehicle controlling apparatus provides the user with information on the behavior of the vehicle 10 while controlling the behavior of the vehicle 10 (S440). For example, the vehicle controlling apparatus may notify the user that the vehicle 10 is controlled to secure a space for trunk use through the display unit 120 and/or the terminal 12.

When Step S420 determines that the vehicle 10 needs no movement or when Step S430 proceeds to secure the space for trunk use, the vehicle controlling apparatus opens the door of the trunk (S450).

The vehicle controlling apparatus recognizes a trunk use termination request (S460). For example, the vehicle controlling apparatus may recognize the trunk use termination request by receiving the same request from the user through the input unit 100 and/or the terminal 12 or by detecting the user's distancing from the trunk or certain motion through the sensing unit 110.

In response to the trunk use termination request, the vehicle controlling apparatus returns the vehicle 10 to the original parking state (S470). To this end, the vehicle controlling apparatus may generate a trajectory for moving the vehicle 10 to the original parking position and/or posture while avoiding obstacles around the vehicle 10.

When the user skips a separate trunk use termination request to get in the vehicle 10 immediately after using the trunk, the vehicle controlling apparatus may also skip the step of returning the vehicle 10 to the original parking state to unpark the vehicle right away.

Although FIG. 4 presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by FIG. 4 or by performing one or more of the steps thereof in parallel. Hence the steps in FIG. 4 are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device The programmable processor may be a special-purpose processor or a general-purpose processor. Computer programs, also known as programs, software, software applications, or codes, contain instructions for a programmable processor and are stored in a "computer-readable recording medium."

The computer-readable recording medium includes any types of recording devices on which data that can be read by a computer system are recordable. Examples of computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. In one example, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

As described above, according to some embodiments, the present disclosure can secure not only a space for opening a trunk door but also a space for allowing the user to enter the trunk side of the vehicle 10 as well as a space for the user to conveniently load and unload goods at the trunk, thereby preventing an awkward (e.g., inconvenient) situation in which the user has to load or unload goods through a half-open trunk door in a narrow space. Furthermore, according to some embodiments, the present disclosure can control the vehicle 10 to be autonomously parked back to the original position after using the trunk to improve user convenience.

Although embodiments of the present disclosure have been described for illustrative purposes, those having ordinary skill in the art should appreciate that various modifications, additions, and substitutions are possible, without departing from the idea and scope of the claimed disclosure. Therefore, embodiments of the present disclosure have been described for the sake of brevity and clarity. The scope of the technical idea of the embodiments of the present disclosure is not limited by the illustrations. Accordingly, one of ordinary skill in the art would understand the scope of the claimed disclosure is not to be limited by the above explicitly described embodiments but by the claims and equivalents thereof.

REFERENCE NUMERALS

10: vehicle
12: terminal
100: input unit
110: sensing unit
120: display unit
130: driving unit
140: communication unit
150: storage
160: control unit

What is claimed is:

1. A method, performed by a device of a vehicle, for controlling the vehicle, the method comprising:
recognizing a request to use a trunk;
obtaining parking status information of the vehicle;
controlling the vehicle to secure a trunk working space for use of the trunk based on the parking status information of the vehicle;
opening a door of the trunk in response to securing the trunk working space;
recognizing a request to terminate the use of the trunk; and
controlling the vehicle to return to an original parking position, original parking posture, or combinations thereof, in response to the request to terminate the use of the trunk.

2. The method of claim 1, wherein the trunk working space comprises:
a space for opening the door of the trunk;
a space for a user to enter a trunk side of the vehicle; and
a space for loading and unloading goods.

3. The method of claim 1, wherein the obtaining of the parking status information of the vehicle comprises:
detecting one or more obstacles around the vehicle; and
determining whether the obstacle interrupts the use of the trunk.

4. The method of claim 3, wherein the controlling of the vehicle comprises:
moving the vehicle forward to secure the trunk working space in response to determining that an obstacle that is detected rearward of the vehicle interrupts the use of the trunk.

5. The method of claim 3, wherein the controlling of the vehicle comprises:
moving the vehicle backward to secure the trunk working space in response to determining that an obstacle that is detected in front of the vehicle interrupts the use of the trunk.

6. The method of claim 3, wherein the controlling of the vehicle comprises:
controlling a steering of the vehicle to secure the trunk working space in response to determining that a first obstacle that is detected at one side of the vehicle interrupts the use of the trunk and that a second obstacle that is detected at another side of the vehicle prevents the vehicle from moving forward or backward.

7. The method of claim 1, further comprising:
providing a user of the vehicle with information on a behavior of the vehicle.

8. An apparatus for controlling a vehicle, the apparatus comprising:
a control unit configured to:
obtain parking status information of the vehicle in response to a request to use a trunk;
control the vehicle to secure a trunk working space for use of the trunk based on the parking status information of the vehicle;
open a door of the trunk upon securing the trunk working space;
recognize a request to terminate the use of the trunk; and
control the vehicle to return to an original parking position, original parking posture, or combinations thereof, in response to the request to terminate the use of the trunk.

9. The apparatus of claim 8, wherein the trunk working space comprises:
a space for opening the door of the trunk;
a space for a user to enter a trunk side of the vehicle; and
a space for loading and unloading goods.

10. The apparatus of claim 8, wherein the control unit is configured to obtain the parking status information of the vehicle by detecting one or more obstacles around the vehicle and determining whether the obstacle interrupts the use of the trunk.

11. The apparatus of claim 10, wherein the control unit is configured to move the vehicle forward to secure the trunk working space in response to determining that an obstacle that is detected rearward of the vehicle interrupts the use of the trunk.

12. The apparatus of claim 10, wherein the control unit is configured to move the vehicle backward to secure the trunk working space in response to determining that an obstacle that is detected in front of the vehicle interrupts the use of the trunk.

13. The apparatus of claim 10, wherein the control unit is configured to control a steering of the vehicle to secure the trunk working space in response to determining that a first obstacle that is detected at one side of the vehicle interrupts the use of the trunk and that a second obstacle that is detected at another side of the vehicle prevents the vehicle from moving forward or backward.

14. A vehicle comprising an apparatus for controlling the vehicle, the apparatus comprising:
a control unit configured to:
obtain parking status information of the vehicle in response to a request to use a trunk;
control the vehicle to secure a trunk working space for use of the trunk based on the parking status information of the vehicle;
open a door of the trunk upon securing the trunk working space;
recognize a request to terminate the use of the trunk; and
control the vehicle to return to an original parking position, original parking posture, or combinations thereof, in response to the request to terminate the use of the trunk.

* * * * *